Patented Feb. 12, 1935

1,990,906

UNITED STATES PATENT OFFICE 1,990,906

VULCANIZATION OF RUBBER

Maldwyn Jones, Crumpsall, and William Johnson Smith Naunton, Prestwich, England, assignors to Imperial Chemical Industries Limited, a corporation of Great Britain No Drawing. Application January 13, 1933, Serial No. 651,622. In Great Britain January 18, 1932

21 Claims. (Cl. 18—53)

This invention relates to the vulcanization of rubber and more particularly to improved accelerators therefor.

Many compounds are known which have the property of accelerating the vulcanization of rubber. The most desirable of such accelerators are those which are most active and cause the vulcanization to take place within the shortest periods of time. It is well known that the more active accelerators are generally active at low temperatures and tend to cause prevulcanization or scorching during processing steps which are necessary prior to the vulcanization step. Such prevulcanization or scorching is very objectionable and many attempts have been made to prevent the same.

An object of the present invention is to provide an improved accelerator for the vulcanization of rubber. A further object is to provide an accelerator which will be very active at the normal vulcanization temperatures but substantially inactive at lower temperatures. Still further objects are to provide new compositions of matter and to advance the art. Other objects will appear hereinafter.

These objects may be accomplished in accordance with our invention which comprises employing a di-arylthiazyl disulphide together with tetraethylthiuram disulphide in certain proportions for accelerating the vulcanization of rubber. When these two compounds are employed together in the desired proportions for accelerating the vulcanization of rubber, there is substantially no tendency for pre-vulcanization or scorching to take place during processing operations, even though the temperatures involved in such operations are as high at 110° C. However, when a rubber mix containing these two compounds is subjected to the normal vulcanization temperatures of about 141° C., the vulcanization will take place in substantially the same time usually required when other so-called super-accelerators are employed. In other words, our new accelerator does not become active until a temperature above that normally attained during any processing operation is reached, but when normal vulcanizing temperatures are employed, the accelerator becomes extremely active.

Although the relative proportions of these two compounds may be varied within rather wide limits, we have found that they should be employed in such ratio that there is at least 40 (i. e. 2) parts of the di-arylthiazyl disulphide to not more than 60 (i.e.3) parts of the tetraethylthiuram disulphide. Also, in order to obtain satisfactory results, the di-arylthiazyl disulphide should not amount to more than ten times the amount of the tetraethylthiuram disulphide. Accordingly, the di-arylthiazyl disulphide may vary from 2 to 30 parts for each 3 parts of tetraethylthiuram disulphide. While the proportions of these compounds may be varied within the limits set forth above, we have found that the most satisfactory accelerator is provided by employing about 2 parts of the di-arylthiazyl disulphide to 1 part of tetraethylthiuram disulphide.

The two compounds may be intimately mixed to form a composition constituting our accelerator which may then be added to a rubber mix whereby the two compounds are added simultaneously to the mix. This method of adding the compounds will generally be preferred. However, when processing operations are unlikely to cause any considerable rise in temperature, the two compounds may be admixed with the rubber, separately.

In order to more fully illustrate our invention, and the preferred mode of carrying the same into effect, the following examples are given:

Example 1

A rubber mix was prepared from crepe rubber, 100 parts, zinc oxide 10 parts, barytes 75 parts, stearic acid 1 part, sulphur 2 parts, dibenzothiazyl disulphide 0.25 part, tetraethylthiuram disulphide 0.125 part.

When this mix was heated at 141° C., the normal vulcanization temperature, and 110° C., the maximum temperature which is likely to be obtained during any processing operation, the results given in the folowing table were obtained:

| Time and temperature of cure | Tensile strength (kilo per sq. cm.) |
|---|---|
| 5 mins. at 141° C. | 2 |
| 10 " " " | 195 |
| 15 " " " | 181 |
| 45 mins. at 110° C. | No cure |
| 60 " " " | No cure |
| 75 " " " | 4 |
| 90 " " " | 91 |

In order to illustrate more precisely how the behaviour of our mixture differs from that of a well-known "super-accelerator" the results which may be obtained by substituting 0.375 part of tetramethylthiuram disulphide for the accelerator mixture given in the above example are given in the following example.

Example 2

A rubber mix was prepared from 100 parts crepe rubber, 10 parts zinc oxide, 75 parts barytes, 1 part stearic acid, 2 parts sulphur and 0.375 part tetramethylthiuram disulphide.

When samples of this mix were tested as in Example 1, the following results were obtained:

| Time and temperature of cure | Tensile strength (kilos per sq. cm.) |
|---|---|
| 5 mins. at 141° C. | 93 |
| 10 " " | 190 |
| 15 " " | 151 |
| 45 mins. at 110° C. | 4 |
| 60 " " | 174 |
| 75 " " | 202 |
| 90 " " | 186 |

Example 3

To still further illustrate the advantages of our new accelerator, rubber mixes containing the same and similar rubber mixes containing tetraethylthiuram disulphide were subjected to tests with a "recovery plastometer." This is an adaptation of the well known William's "parallel plate plastometer." The results obtained depend upon the fact that as scorching, e. g. vulcanization proceeds, rubber shows an increasing tendency to recover its original shape after compression. Samples from the rubber mixes were heated for varying times at 100° C. and then the percentage recovery determined with the "recovery plastometer:" The results obtained are shown in the following tables:

Rubber mix:— Parts by weight
Pale crepe rubber_____ 100
Zinc oxide_____ 10
Barytes_____ 75
Stearic acid_____ 1
Sulphur_____ 2
Accelerator A or B_____ 0.375

*Accelerator A.*—A mixture of 0.25 part of dibenzothiazyl disulphide and 0.125 parts of tetraethylthiuram disulphide.

*Accelerator B.*—Using 0.375 part of tetramethylthiuram disulphide alone.

| Time of heating sample at 100° C. in minutes | 0 | 30 | 60 | 90 | 120 | 150 |
|---|---|---|---|---|---|---|
| Percentage recovery—A | 5 | 5 | 6 | 6 | 9 | 56 |
| Percentage recovery—B | 10 | 10 | 19 | 57 | 87 | 85 |

These figures show that the mix containing A is only partly scorched after 150 minutes heating at 100° C. whereas the mix containing B) tetramethylthiuram disulphide alone) begins to scorch after 60 minutes heating and is fully scorched after 120 minutes heating at 100° C.

Although, in the above tests, we have employed dibenzothiazyl disulphide, other di-arylthiazyl disulphides may be substituted therefor with advantageous results. Among the other di-arylthiazyl disulphides which may be mentioned are ditolylthiazyl disulphide, diethoxybenzothiazyl disulphide and dinaphthothiazyl disulphides. Other equivalent di-arylthiazyl disulphides which may be employed will be readily apparent to those skilled in the art. In the above tests, we have employed 0.375 part of accelerator to 100 parts of rubber. However, it is to be understood that the proportion of accelerator to rubber may be widely varied, depending upon the particular mix employed and the desire of the user.

While we have disclosed specific compounds employed in specific mixtures, it will be readily understood that various changes and modifications may be made, in the compounds, mixtures and methods employed, without departing from the spirit of our invention. Accordingly, our invention is to be limited solely by the appended claims, construed as broadly as is permissible in view of the prior art.

We claim:

1. A process of rubber vulcanization wherein scorching is prevented or diminished by use of dibenzthiazyl disulphide and tetraethylthiuram disulphide with one another as vulcanization accelerators.

2. The process of vulcanizing rubber which comprises incorporating in a rubber mix prior to vulcanization a di-arylthiazyl disulphide and tetraethylthiuram disulphide in the proportions of at least 2 parts of the di-arylthiazyl disulphide to not more than 3 parts of tetraethylthiuram disulphide, and thereafter subjecting the mix to vulcanizing conditions.

3. The process of vulcanizing rubber which comprises incorporating in a rubber mix prior to vulcanization a di-arylthiazyl disulphide and tetraethylthiuram disulphide in the proportions of about 30 to about 2 parts of the di-arylthiazyl disulphide to about 3 parts of tetraethyl thiuram disulphide, and thereafter subjecting the mix to vulcanizing conditions.

4. The process of vulcanizing rubber which comprises incorporating in a rubber mix prior to vulcanization a di-arylthiazyl disulphide and tetraethylthiuram disulphide in the proportions of about 2 parts of the di-arylthiazyl disulphide to about 1 part of tetraethylthiuram disulphide, and thereafter subjecting the mix to vulcanizing conditions.

5. Rubber having incorporated therein a di-arylthiazyl disulphide and tetraethylthiuram disulphide in the proportions of at least 2 parts of the di-arylthiazyl disulphide to not more than 3 parts of tetraethylthiuram disulphide.

6. Rubber having incorporated therein a di-arylthiazyl disulphide and tetraethylthiuram disulphide in the proportions of about 30 to about 2 parts of the di-arylthiazyl disulphide to about 3 parts of tetraethylthiuram disulphide.

7. Rubber having incorporated therein a di-arylthiazyl disulphide and tetraethylthiuram disulphide in the proportions of about 2 parts of the di-arylthiazyl disulphide to about 1 part of tetraethylthiuram disulphide.

8. The process of vulcanizing rubber which comprises incorporating in a rubber mix prior to vulcanization a dibenzothiazyl disulphide and tetraethylthiuram disulphide in the proportions of at least 2 parts of the dibenzothiazyl disulphide to not more than 3 parts of tetraethylthiuram disulphide, and thereafter subjecting the mix to vulcanizing conditions.

9. The process of vulcanizing rubber which comprises incorporating in a rubber mix prior to vulcanization a dibenzothiazyl disulphide and tetraethylthiuram disulphide in the proportions of about 30 to about 2 parts of the dibenzothiazyl disulphide to about 3 parts of tetraethyl thiuram disulphide, and thereafter subjecting the mix to vulcanizing conditions.

10. The process of vulcanizing rubber which comprises incorporating in a rubber mix prior to vulcanization a dibenzothiazyl disulphide and tetraethylthiuram disulphide in the proportions of about 2 parts of the dibenzothiazyl disulphide to about 1 part of tetraethylthiuram disulphide, and thereafter subjecting the mix to vulcanizing conditions.

11. Rubber having incorporated therein a dibenzothiazyl disulphide and tetraethylthiuram disulphide in the proportions of at least 2 parts of the dibenzothiazyl disulphide to not more than 3 parts of tetraethylthiuram disulphide.

12. Rubber having incorporated therein a dibenzothiazyl disulphide and tetraethylthiuram disulphide in the proportions of about 30 to about 2 parts of the dibenzothiazyl disulphide to about 3 parts of tetraethylthiuram disulphide.

13. Rubber having incorporated therein a dibenzothiazyl disulphide and tetraethylthiuram disulphide in the proportions of about 2 parts of the dibenzothiazyl disulphide to about 1 part of tetraethylthiuram disulphide.

14. The process of vulcanizing rubber which comprises incorporating in a rubber mix prior to vulcanization dibenzothiazyl disulphide and tetraethylthiuram disulphide in the proportions of about 30 to about 2 parts of dibenzothiazyl disulphide to about 3 parts of tetraethyl thiuram disulphide, and thereafter subjecting the mix to vulcanizing conditions.

15. The process of vulcanizing rubber which comprises incorporating in a rubber mix prior to vulcanization dibenzothiazyl disulphide and tetraethylthiuram disulphide in the proportions of about 2 parts of dibenzothiazyl disulphide to about 1 part of tetraethylthiuram disulphide, and thereafter subjecting the mix to vulcanizing conditions.

16. Rubber having incorporated therein dibenzothiazyl disulphide and tetraethylthiuram disulphide in the proportions of about 30 to about 2 parts of dibenzothiazyl disulphide to about 3 parts of tetraethylthiuram disulphide.

17. Rubber having incorporated therein dibenzothiazyl disulphide and tetraethylthiuram disulphide in the proportions of about 2 parts of dibenzothiazyl disulphide to about 1 part of tetraethylthiuram disulphide.

18. The process of vulcanizing rubber which comprises incorporating in a rubber mix prior to vulcanization a ditolylthiazyl disulphide and tetraethylthiuram disulphide in the proportions of about 30 to about 2 parts of the ditolylthiazyl disulphide to about 3 parts of tetraethyl thiuram disulphide, and thereafter subjecting the mix to vulcanizing conditions.

19. Rubber having incorporated therein a ditolylthiazyl disulphide and tetraethylthiuram disulphide in the proportions of about 30 to about 2 parts of the ditolylthiazyl disulphide to about 3 parts of tetraethylthiuram disulphide.

20. The process of vulcanizing rubber which comprises incorporating in a rubber mix prior to vulcanization a dinaphthothiazyl disulphide and tetraethylthiuram disulphide in the proportions of about 30 to about 2 parts of the dinaphthothiazyl disulphide to about 3 parts of tetraethyl thiuram disulphide, and thereafter subjecting the mix to vulcanizing conditions.

21. Rubber having incorporated therein a dinaphthothiazyl disulphide and tetraethylthiuram disulphide in the proportions of about 30 to about 2 parts of the dinaphthothiazyl disulphide to about 3 parts of tetraethylthiuram disulphide.

WILLIAM JOHNSON SMITH NAUNTON.
MALDWYN JONES.